June 13, 1967     H. V. ROBERTS, JR., ET AL     3,325,636
RETRACTABLE HEADLIGHT SYSTEM
Filed Dec. 4, 1964     3 Sheets-Sheet 1
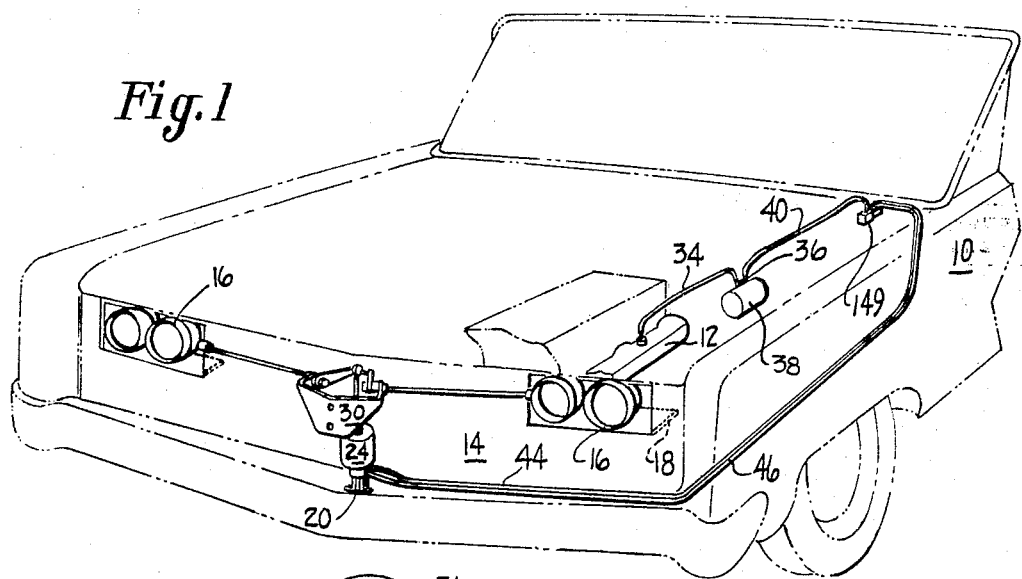
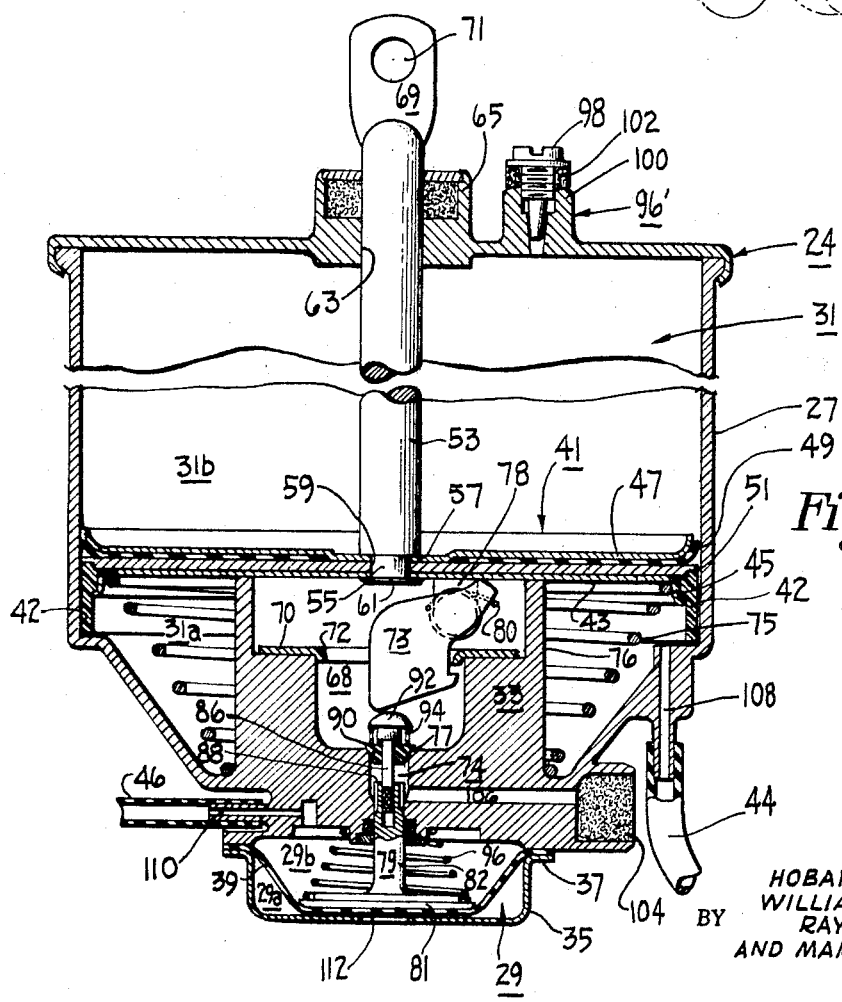
INVENTORS
HOBART V. ROBERTS,
WILLIAM C. RIESTER,
RAYMOND A. DEIBEL
AND MARTIN BITZER INVENTORS
HOBART V. ROBERTS,
WILLIAM C. RIESTER,
RAYMOND A. DEIBEL
AND MARTIN BITZER.
BY United States Patent Office 3,325,636
Patented June 13, 1967

3,325,636
RETRACTABLE HEADLIGHT SYSTEM
Hobart V. Roberts, Jr., Elma, William C. Riester, Williamsville, Raymond A. Deibel, Cheektowaga, and Martin Bitzer, Kenmore, N.Y., assignors to Trico Products Corporation, Buffalo, N.Y.
Filed Dec. 4, 1964, Ser. No. 416,026
9 Claims. (Cl. 240—7.1)

The present invention relates to an actauting system for retractable headlights for motor vehicles.

Retractable headlights are used in modern automotive vehicles to preserve the aesthetic appearance by providing uninterrupted grill or fender lines. The headlamp units rotate to a concealed position and cause a closure member integral with the unit which blends with the area in which the lights are disposed to replace the headlamp position. When the lights are switched on the closure member is moved to a concealed position and the headlights take an operative position. In addition to the aesthetic aspect, retractable headlights have for an object the avoidance of roadway spray collecting on the lenses during daylight driving. Thus maximum illuminating ability is maintained when the lights are required during darkness. It is desirable in such a system to provide control mechanism which will operate together with the light energizing switch. Further it is essential that such a system be fail-safe in its operation. More specifically, if the power unit for rotating the headlights fails it is essential that the headlights be readily movable to an operative position so that a vehicle will never be without proper lights when required.

The principal object of the present invention is to provide a fail-safe vacuum operated retractable headlight system with a unique linkage system wherein a plurality of headlamp sets may be actuated with a single power unit to provide smooth motion.

Another object of the invention is to provide an improved retractable headlight system for rotating headlights between operative and rest positions utilizing vacuum power for retaining the headlamps in one of the positions and a spring for actuating the headlamps to the other of the positions.

A further object of the invention is to provide an improved vacuum actuated retractable headlight system for rotating headlamps from an operative to an inoperative position and vice versa utilizing a mechanical latch to retain the lamps in one position during periods of low manifold vacuum and wherein a vacuum actuated trip mechanism is provided to release the mechanical latch when the headlights are switched on.

Other objects and advantages of the invention will be apparent from the following detailed description taken in connection with the accompanying drawings in which FIG. 1 is a partial perspective view of a motor vehicle incorporating the invention;

FIG. 2 is a longitudinal cross sectional view of the power unit;

Figure 3:
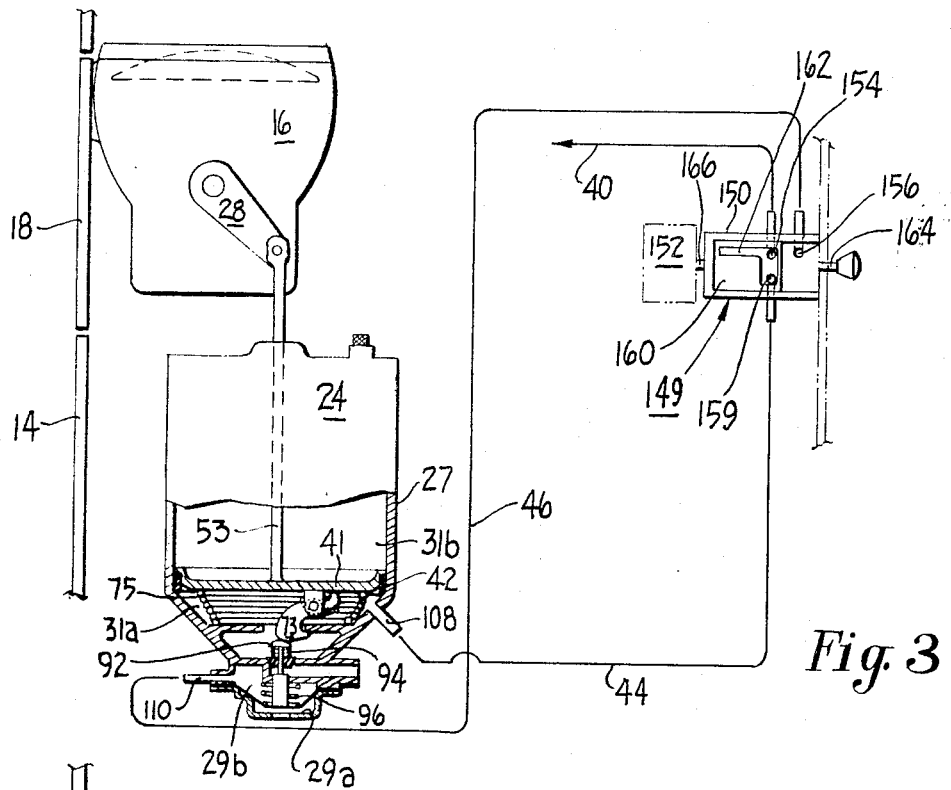
FIG. 3 is a schematic diagram with the headlamp units in retracted position illustrating the vacuum system.

Briefly, the invention comprises a power unit mounted intermediate a pair of headlight sets which rotate on axes angularly disposed to each other. The power unit includes a piston operated actuating shaft having a cross shaft at its outer end. A pair of crank arms are pivotally and slidably received on the cross shaft with self aligning bearings. The crank arms are angularly disposed toward each other and have rigidly secured at the ends remote from the cross shaft for movement therewith a pair of rods positioned along the axis of rotation of a respective headlight set. Each rod is rigidly connected at its end remote from the crank arms to the headlight set for movement therewith. The actuating shaft of the power unit is disposed in retracted position when the headlamps are retracted and, as illustrated, is held in retracted position by a latch and a vacuum hold against bias of a spring. A diaphragm actuated trip mechanism is provided having a plunger which trips the latch and opens a valve to bleed to atmosphere the main piston chamber. When this occurs the spring urges the piston outwardly causing the actuating rod to project outwardly turning the crank arms and the headlight actuating rods thereby moving the headlights to operative position. To actuate the trip mechanism a combination headlamp switch and power unit control is provided at a place convenient to the vehicle operator. The control closes contacts to energize the headlamp support and at the same time moves a valve in the control to a position to supply vacuum to the diaphragm of the trip mechanism.

In FIG. 1 there is shown a motor vehicle 10 having an intake manifold 12. A grill 14 is provided in the front end of the car having a pair of retractable headlight sets 16 each including a grill section 18 substantially at right angles to the face of the headlights 16 whereby retraction of the headlights causes the grill sections 18 to complete an uninterrupted grill surface. The headlights 16 are rotatable about an axis parallel to the plane of the grill section in which they are disposed, from an operative position shown in FIG. 1 and FIG. 4 to a retracted position (FIG. 3) wherein the grill sections 18 rotate to a position to complete the uninterrupted grill surface. A power unit 24 is pivotally mounted on bracket 20 secured to a rigid portion of the vehicle frame adjacent the lower end of the grill 14 on the inner side thereof substantially centrally between the headlights. The headlight sets 16 are each journalled at their inner sides in a bracket 21 having an apertured ear 21′ in which is journalled for rotation a rod connector 23 secured rigidly to a lug 25 on the headlamp frame. The headlamps are similarly journalled on their outer sides (not shown).

The power unit 24 is provided for actuating the headlamps at 16 through a linkage transmission system. The power unit 24 comprises a housing or a frame 27 which includes a trip latch actuating chamber 29 and a power chamber 31 separated by an internal hub section 33. The trip latch actuating chamber is formed by the outer end of the hub section 33 and a cap 35 having an annular radially extending flange 37. The flange 37 lies adjacent the outer end of the hub portion of the cap. A diaphragm 39 is disposed within the chamber 29 with its peripheral edge disposed between the annular flange 37 and the outer end of the hub section 33. The cap 35 is secured to the hub section 33 in any suitable or desirable manner. The diaphragm 39 divides the trip latch actuating chamber 29 into an outer compartment 29a and an inner compartment 29b.

The power chamber 31 of the housing 27 is divided into compartments 31a and 31b by a movable wall or piston assembly 41 reciprocable within the chamber 31. The piston assembly 41 includes an inner plate 43 of rigid material having an upstanding annular flange 45 which forms a spring retainer and an outer plate 47 of rigid material. A piston stabilizing member 42 which may be a ring of plastic or other suitable anti-friction material circumscribes the annular flange 45 and includes a substantial bearing surface which engages the inner wall of cylinder or housing 27. Disposed between the plate 45 and the plate 47 is a piston packing 49 of elastomeric or rubber-like material and a spacer plate 51 of rigid material. An actuating shaft 53 having a reduced end portion 55 forming a shoulder 57 is rigidly secured to the piston assembly 41. The piston assembly 41 has a central opening 59 which is received on the reduced end portion 55 of shaft 53. The periphery of the central opening 59 abuts the shoulder 57. The shaft 53 is headed at 61 to rigidly retain the piston assembly 41 thereon. The shaft 53 extends outwardly through a central opening 63 in the end wall of housing 27. The inner surface of opening 63 cooperates with the piston stabilizer 42 to maintain the piston assembly 41 together with the actuating shaft or rod 53 in proper alignment to produce smooth, free movement and balanced thrust in the centrally positioned actuator or power unit 24. Surrounding the central opening 63 is a cup-like portion 65 which is filled with a porous material 67 for retaining lubricant to lubricate the shaft 53 during its inward and outward movements. The free end 69 of the shaft 53 is flattened and has a cross shaft 71 extending perpendicularly outwardly from each side of the flattened end portion 69. A coil spring 75 is disposed within the compartment 31a of chamber 31 and is retained at one end against the plate 43 by the flange 45. It is retained at its other end intermediate the side wall of the hub section 33 and the side wall of the housing 27.

The hub disposed between the trip latch actuating chamber 29 and the power chamber 41 includes a central recess 68. A plate 70 of rigid material having a central opening is disposed about the periphery of the recess 68 and has a lip portion 72 about the periphery of the central opening which extends inwardly of the recess. The lip portion 72 forms a latch retainer for engaging the hook end of a latch lever 73. An axially extending annular flange 76 circumscribes the periphery of the hub 73 and serves as a stop for piston assembly 41.

Secured adjacent the center of plate 43 of piston assembly 41 is a bracket 78 upon which is pivotally mounted a latch lever 73. The latch lever 73 is biased in a counter-clockwise direction as viewed in FIG. 2 by torsion spring 80. When the piston assembly 41 is in its innermost position against the flange 76, which forms a stop therefor, the latch lever 73 moves into the recess 68 and the hook end engages the latch lip 72 to latch the piston assembly 41 and the actuating rod 53 in its innermost position against the bias of a spring 75.

A central bore 74 is formed through the base wall of the hub 33. It opens at one end into the recess 68 and at the other end into the compartment 29b of the trip latch actuating chamber 29. A valve seat 77 is provided at the end of the bore 74 adjacent the recess 68. A trip latch plunger assembly 79 is provided which has a head portion 81 bearing centrally on the diaphragm 39 in trip latch chamber 29 and a stem portion 82 which extends through the bore 74. An O-ring seal 84 circumscribes the periphery of the bore 74 to provide an airtight seal about the stem 82 which is received in the bore 74. The stem 82 has a reduced end portion 86 forming a shoulder 88 facing toward the recess 68. The reduced portion may be integral with the stem 82 or may be pressed into a recess in the stem 82 as shown and retained rigid therewith as by knurling as shown therein. A poppet valve 90 is slidably received on the reduced portion 86 of stem 82. A coil spring 94 is received on the stem 82 between a head 92 at the free end of stem 82 and the valve 90, thereby biasing the valve into engagement with the valve seat 77. The plunger assembly 79 may be driven inwardly by movement of diaphragm 62 against the bias of a spring 96 which is interposed between the head 81 of plunger assembly 79 and the outer end of hub 33. The head 92 then engages latch lever 73 to disengage the hooked end from lip 72. Continued inward movement of plunger assembly 79 causes the shoulder 88 to engage the valve 90 thereby unseating it against the bias of spring 94 for a purpose to be explained hereinafter.

The housing 27 includes an adjustable atmospheric bleed 96' of any suitable type, as for example that shown. The bleed shown comprises a threaded needle valve 98 receivable in a boss 100. The needle valve 98 includes a flanged head which compresses porous material 102 between the boss 100 and the flange of the needle valve 98. The extent to which the porous material 102 is compressed controls the rate of flow of the atmospheric bleed 96'. The bleed 96' communicates with compartment 31b of chamber 31. An atmospheric bleed 104 communicates with compartment 31a of chamber 31 through a radial port 106, bore 74, valve 90 and recess 68 in hub 33. A port 108 is provided for communication between compartment 31a and a source of fluid pressure, preferably vacuum pressure. A port 110 is provided for communication between compartment 29b of chamber 29 and a source of vacuum pressure. The cap 35 forming trip latch chamber 29 has a central opening 112 effecting communication between compartment 29a and atmosphere. The opening 112 is of a large enough dimension to permit an operator to insert a finger for applying pressure to head 81 of plunger assembly 79 thereby providing for manual unlatching of latch lever 73 in the event of failure of the automatic system. This renders the system fail-safe.

A control switch 149 for manually controlling the retractable headlights is provided for mounting on the dash panel or other suitable or convenient place for operator use. The control switch 149 includes a valve portion 150 and an electrical switch portion 152. The electrical switch includes three positions; an off position, a parking light position and an on position. The headlights are in retracted position when the switch is in the off position and when the switch is in the parking light position. When the switch is moved to the on position the headlights rotate to operative position. The control switch 149 includes electrical contacts, not shown, and a valve housing 150. The valve housing 150 has a port 154 communicating with a vacuum source, a port 156 communicating with compartment 29b of the trip latch operating chamber 29, and a port 159 communicating with compartment 31a of the power unit 24. A slide valve 160 is reciprocable within the housing 150 and includes an L-shaped facial recess 162. The valve is operable by a stem 164 which has an extension 166 for operating the electrical contacts, not shown, in housing 152. A hand knob is provided on the outermost end of stem 164 located within convenient reach of the operator. When the stem 164 is depressed to its innermost position the contacts for the lighting system are open. In this position port 154 is connected by one leg of L-shaped recess 162 to port 159. When the stem 164 is moved outwardly to a first intermediate position contacts are closed in housing 152 to energize the parking light circuit. Ports 154 and 159 remain in communication through a leg of the facial recess 162. When the stem 164 is moved to its outermost position port 159 is closed. In this position port 154 is connected to port 156 through the other legs of the facial recess 162.

The fluid pressure supply system for the power unit includes a conduit 34 which connects the intake manifold 12 through a check valve 36 to a vacuum storage tank 38. A conduit 40 from a vacuum storage tank 38 is connected to the port 154 of the manual control 149. The check valve 36 may be of any suitable type which will permit vacuum to flow from the tank 38 to the conduit 40 when the vacuum pressure in the tank 38 is greater than the vacuum pressure in the manifold 12. When vacuum pressure in tank 38 is lower than the vacuum pressure produced by intake manifold 12 then the check valve 36 will permit vacuum to flow from line 34 to line 40. A conduit 44 connects port 159 of control 149 to port 108 which is in communication with compartment 31a of the power unit 24. A conduit 46 connects port 156 of the manual control 149 to port 110 in communication with compartment 29b of chamber 29 of the power unit 24.

The operation of the power unit should now be apparent. When the stem 164 of the control 149 is in its depressed position, as shown in FIG. 3, with the contacts of the light switch open the facial recess 162 effects communication between the source of vacuum through conduit 40, port 154, recess 162, port 159, conduit 44, port 108 and compartment 31a of power chamber 31 in power unit 24. In this position the piston assembly 41 is drawn inwardly to compress spring 75 and the actuating rod 53 is in its retracted position. The latch lever 73 engages the lip 72. Should manifold vacuum or tank vacuum be low or depleted the latch lever 73 will retain the piston assembly 41 together with the actuating rod 53 in its retracted position. When the stem 164 is drawn outwardly to its next position the contacts of the parking light circuit are closed energizing the parking lights but the fluid pressure supply system remains in the same position as when the stem is depressed and then the power unit remains in its retracted position. When the stem 164 is drawn to its outermost position (FIG. 4) the headlight energizing circuit is closed and the vacuum source is connected through conduit 40, port 154, facial recess 162, port 156, conduit 46, port 110 to compartment 29b of trip latch actuating chamber 29 in power unit 24. The diaphragm 39 is thus drawn inwardly driving plunger assembly 79 inwardly causing head 92 to engage latch lever 73 and thus disengaging the hook end of latch lever 73 from the lip 72 thereby releasing the mechanical latching of piston assembly 41. Continued movement of the diaphragm 39 and the plunger assembly 79 causes shoulder 88 of stem 82 to engage valve 90 and move it off of valve seat 77 compressing spring 96 thereby opening compartment 31a of chamber 31 to the atmosphere through conduit 106 in hub 33 and atmospheric vent 104. Spring 75 expands to drive piston 41 together with actuating rod 53 smoothly and slowly outwardly as the super-atmosphere in compartment 31b bleeds through controlled or adjustable atmospheric bleed or orifice 96.

Figure 4:
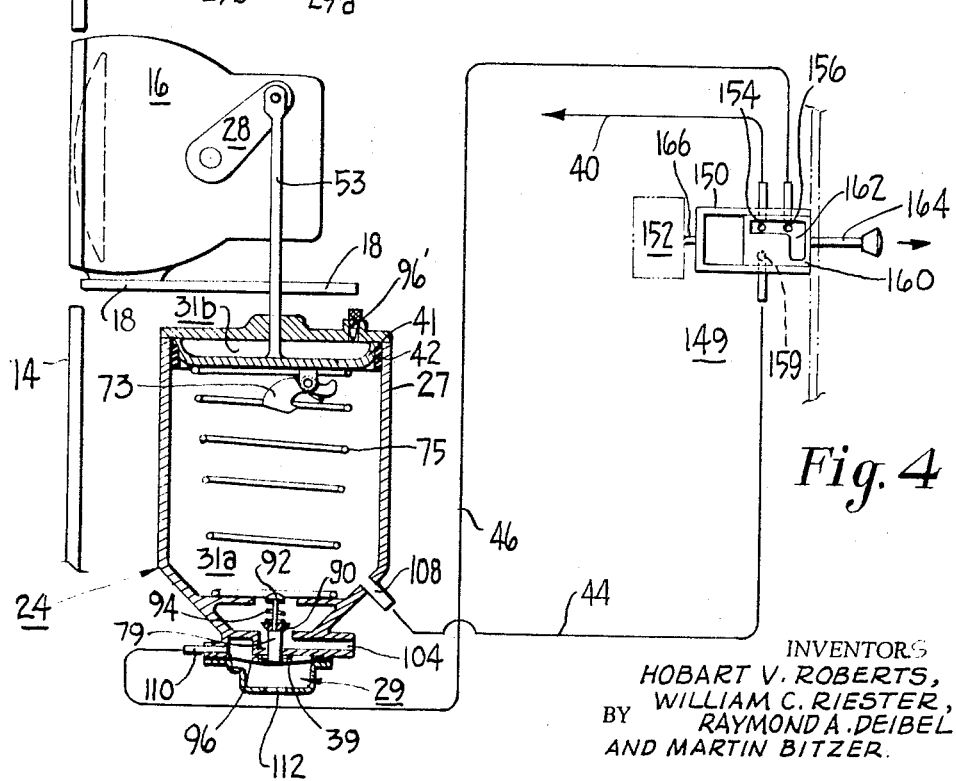
FIG. 4 is a schematic diagram similar to FIG. 3 with the headlamp units in operative position.
Figure 5:
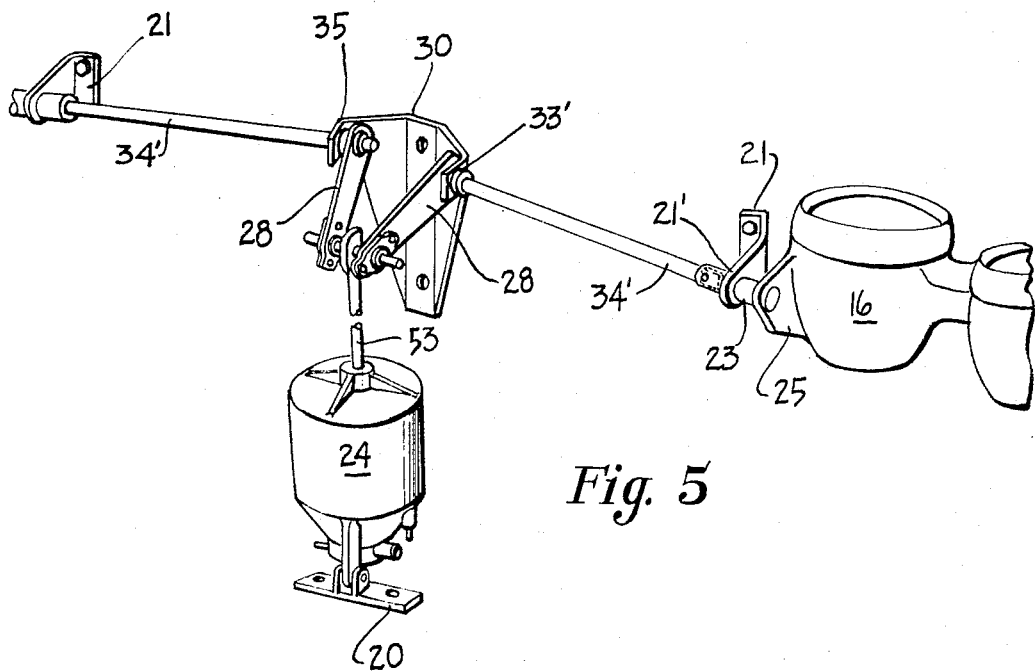
FIG. 5 is a perspective view of the linkage utilized in this invention.

When the manual control 149 is depressed from the FIG. 4 position to an intermediate parking light position or to the fully off position shown in FIG. 3, port 156 in the manual control 149 is open to atmosphere thereby venting compartment 29b of chamber 29 in the power unit 24. The spring 96 drives the plunger assembly 79 and diaphragm 39 outwardly as the compartment 29a bleeds through vent 112. The chamber 31a is placed in communication with the vacuum source through conduit 40, port 154, facial recess 162 in manual control 149, port 158, conduit 44 and port 108. The piston assembly 41 and actuating rod 53 are drawn inwardly compressing spring 75 and causing latch lever 73 to engage lip 72. The power unit is then again in its fully retracted position. If for any reason the system fails to operate when the headlights are in retracted position, due to loss of vacuum or blocking of the vacuum lines for example, and it is desired or necessary to place the headlights in operative position, the plunger assembly 79 is accessible through vent 112 and can be manually depressed to disengage latch lever 73 and open valve 90 to vent chamber 31a, thus permitting spring 75 to drive the piston assembly 41 and rod 53 to its extended position.

The headlights 16 are moved through a unique linkage structure which permits the headlight sets 16 to be rotated about axes which are angularly related to each other. The motion is smooth and the headlights are maintained rigid in either a concealed or operative position. The unique linkage structure for rotating the headlight set 16 includes the power unit housing or frame 27 and the power unit actuating rod 53 which extends vertically toward the top of the grill 14. The end of the power unit housing 27 remote from the free end of actuating rod 53 is pivotally mounted on bracket 20 which is rigidly secured to the frame of the vehicle centrally between the headlight sets. A pair of crank arms 28 are pivotally and slidably mounted with self-aligning bearings 32, one on each extending portion of the cross shaft 71. Secured to each crank arm 28 at its end remote from the cross shaft and pivotally mounted on a fixed bracket 30 in bearings 33' on angularly extending arms 35 is a headlight actuating bar 34' which is movable with the crank arm 28. The actuating bars 34' each are aligned with the axis of one of the headlamp sets 16 respectively and the ends of the bars 34' adjacent headlamp set 16 are secured to connector 23 for rotation therewith.

Figure 6:
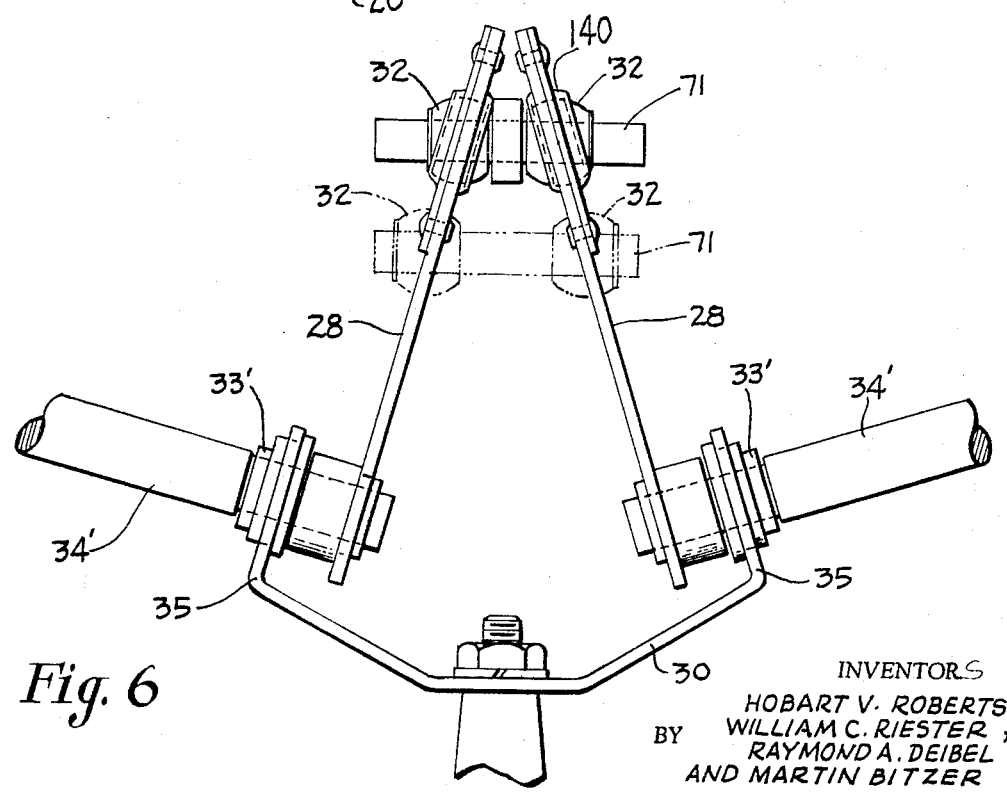
FIG. 6 is a top elevational view of the linkage utilized in this invention.

When the operating shaft 53 is moved to its extended or outward position the headlamp sets 16 are moved to the operative position as shown in FIG. 6. When the operating rod 53 is retracted the headlamp sets 16 are retracted and the filler pieces 18 are positioned to provide a smooth uninterrupted appearing surface at the headlamp position.

Crank arms 28 are rigidly secured to the end of shafts 34' which shafts are in turn journalled in bearings 33'. Crank arms 28 therefore necessarily have a longitudinal axis disposed angularly towards each other. It can be seen from FIGURES 3 and 4 that as the actuating shaft 53 moves from its retracted to extended position and vice versa the ends of the crank arms 28, which are journalled on the cross shaft 71, travel in an arcuate path and effect rotative movement of the actuating shafts 34', which rotative movement is transferred to the headlamp sets 16. Since the rotational axis of the crank arms 28 are angularly disposed toward each other it will be apparent that as the crank arms 28 are rotated about the axes the angle between the crank arms varies. The full line position shown in FIGURE 4 illustrates the mid position of the power unit between retractive and operative positions. The phantom line position of shaft 71 and bearing 32 illustrates the position of the bearings on the shaft at their extreme outermost position. It can be seen that when actuating shaft 53 moves from its fully retracted to its fully open position, the position of the bearings 32 will move from an innermost position adjacent the shaft to an outermost position adjacent the ends of the cross shaft 71 and the crank arms will also pivot about the self-aligning bearings 32.

A unique headlamp retractor system has been described which utilizes a novel linkage arrangement for rotating headlights on axes which are angularly related to each other. It is a system which can be manually actuated to open position and is in this respect fail-safe. In case of failure of the vacuum system it is only necessary to manually depress the plunger assembly 79 to trip latch lever 73 and vent compartment 31a of the power unit 24. This will cause the headlights to move to operative position. The system employs a novel vacuum actuated trip latch mechanism disposed internally in the power unit.

A certain specific embodiment of the invention has been described for the purpose of illustration but it will be apparent that various modifications and other embodiments are possible within the scope of the invention. It is to be understood therefore that the invention is not limited to the specific arrangement shown but in its broadest aspects it includes all equivalent embodiments and modifications which come within the scope of the invention.

What is claimed is:

1. In a motor vehicle having a pair of spaced apart headlight sets, each set being mounted for pivotal movement about an axis angularly disposed to the axis of the other set; a remotely controllable system for pivoting said headlight sets from a retracted position to an operational position comprising a centrally positioned actuator having balanced thrust to equally divide the turning torque between the spaced apart headlight sets and linkage means for connecting said power unit to said headlight sets, said actuator including a fluid pressure powered piston movable between an extended position and a retracted position, an operating shaft secured to said piston for movement therewith operatively connecting said piston and said linkage, internal latch means for retaining said piston in retracted position and a fluid pressure operated trip mechanism for releasing said latch and for controlling the flow of fluid pressure through said power unit to effect sequential movement of said latch means and said piston.

2. In a motor vehicle having a pair of headlight sets, each set being mounted for pivotal movement about an axis angularly disposed to the axis of the other set; a remotely controllable system for pivoting said headlight sets from a retracted position to an operational position comprising a fluid actuated power unit and linkage means for connecting said power unit to said headlight sets, said power unit including a fluid pressure powered piston movable between an extended position and a retracted position, an operating rod secured to said piston for movement therewith operatively connecting said piston and said linkage, internal latch means for retaining said piston in retracted position, a fluid pressure operated trip mechanism for releasing said latch and for controlling the flow of fluid pressure through said power unit to effect sequential movement of said latch means and said piston and auxiliary means for manually actuating said trip mechanism.

3. In a motor vehicle having a pair of headlight sets, each set being mounted for pivotal movement about an axis angularly disposed to the axis of the other set; a remotely controllable system for pivoting said headlight sets from a retracted position to an operational position comprising a power unit and linkage means for connecting said power unit to said headlight sets, said power unit including a fluid pressure powered piston movable between an extended position and a retracted position, an operating rod secured to said piston for movement therewith operatively connecting said piston and said linkage, internal latch means for retaining said piston in retracted position, a fluid pressure operated trip mechanism for releasing said latch and for controlling the flow of fluid pressure through said power unit to effect sequential movement of said latch means and said piston and spring means for moving said piston to extended position.

4. In a motor vehicle having a pair of headlight sets, each set being mounted for pivotal movement about an axis angularly disposed to the axis of the other set; a remotely controllable system for pivoting said headlight sets from a retracted position to an operational position comprising a power unit and linkage means for connecting said power unit to said headlight sets, said power unit including a fluid pressure powered piston movable between an extended position and a retracted position, an operating rod secured to said piston for movement therewith operatively connecting said linkage and said piston, internal latch means for retaining said piston in retracted position, a fluid pressure operated trip mechanism for releasing said latch and for controlling the flow of fluid pressure through said power unit to effect sequential movement of said latch means and said piston, spring means for moving said piston to extended position, and adjustable bleed means for controlling the rate of movement of said piston to extended position.

5. In a motor vehicle having a pair of headlight sets mounted for rotational movement between an operative position and a retracted position; a remotely controllable system for pivoting said headlight sets from said retracted position to said operational position including a power unit and linkage means for connecting said power unit to said headlight sets, said power unit being pivotally mounted and having a retractable operating rod, said linkage means including a pair of crank arms on one end thereof being slidably and pivotally mounted at the free end of said operating rod, a pair of headlight actuating rods, each actuating rod being rigidly secured at one end to the other end of one of said crank arms for rotational movement therewith about a fixed axis, each of said actuating rods having its other end rigidly secured to one of said headlight sets for rotational movement therewith about a fixed axis.

6. In a motor vehicle having a pair of headlight sets, each set being mounted for pivotal movement about an axis angularly disposed to the axis of the other set; a remotely controllable system for pivoting said headlight sets from a retracted position to an operational position comprising a power unit and linkage means for connecting said power unit to said headlight sets, said power unit being pivotally mounted and having a retractable operating rod, said linkage means including a pair of crank arms on one end thereof being slidably and pivotally mounted at the free end of said operating rod, a pair of headlight actuating rods, each actuating rod being rigidly secured at one end to the other end of one of said crank arms for rotational movement therewith about a fixed axis, said crank arms being angularly disposed with respect to each other and mounted on self-aligning antifriction elements, each of said actuating rods having its other end rigidly secured to one of said headlight sets for rotational movement therewith about a fixed axis.

7. In a motor vehicle having a pair of headlight sets mounted for rotational movement between an operative position and a retracted position; a remotely controllable system for pivoting said headlight sets from said retracted position to said operative position comprising a power unit and linkage means for connecting said power unit to said headlight sets, said power units including a fluid pressure powered piston movable between an extended position and a retracted position, an operating rod secured to said piston for movement therewith operatively connecting said linkage and said piston, internal latch means for retaining said piston in retracted position, a fluid pressure operated trip mechanism for releasing said latch and for controlling the flow of fluid pressure through said power unit to effect sequential movement of said latch means and said piston, spring means for moving said piston to extended position, adjustable bleed means for controlling the rate of movement of said piston to extended position, and auxiliary means for manually actuating said trip mechanism.

8. In a motor vehicle having a pair of headlight sets mounted for rotational movement between an operative position and a retracted position; a remotely controllable system for pivoting said headlight sets from said retracted position to said operative position comprising a power unit and linkage means for connecting said power unit to said headlight sets, said power units including a fluid pressure powered piston movable between an extended position and a retracted position, an operating rod secured to said piston for movement therewith, internal latch means for retaining said piston in retracted position, a fluid pressure operated trip mechanism for releasing said latch and for controlling the flow of fluid pressure through said power unit, spring means for moving said piston to extended position, adjustable bleed means for controlling the rate of movement of said piston to extended position, and auxiliary means for manually actuating said trip mechanism, said power unit being pivotally mounted and having a retractable operating rod, said linkage means including a pair of crank arms on one end thereof being slidably and pivotally mounted at the free end of said operating rod, a pair of headlight actuating rods, each actuating rod being rigidly secured at one end to the other end of one of said crank arms for rotational movement therewith about a fixed axis, each of said actuating rods having its other end rigidly secured to one of said headlight sets for rotational movement therewith about a fixed axis.

9. In a motor vehicle having a pair of headlight sets, each set being mounted for pivotal movement about an axis angularly disposed to the axis of the other set; a remotely controllable system for pivoting said headlight sets from a retracted position to an operative position comprising a power unit and linkage means for connecting said power unit to said headlight sets, said power unit including a fluid pressure powered piston, movable between an extended position and a retracted position, an operating rod secured to said piston for movement therewith, internal latch means for retaining said piston in retracted position, a fluid pressure operated trip mechanism for releasing said latch and for controlling the flow of fluid pressure through said power unit, spring means for moving said piston to extended position, adjustable bleed means for controlling the rate of movement of said piston to extended position, auxiliary means for manually actuating said trip mechanism, said power unit being pivotally mounted and having a retractable operating rod, said linkage means including a pair of crank arms on one end thereof being slidably and pivotally mounted at the free end of said operating rod, a pair of headlight actuating rods, each actuating rod being rigidly secured at one end to the other end of one of said crank arms for rotational movement therewith about a fixed axis, said crank arms being angularly disposed with respect to each other and mounted on self-aligning anti-friction elements, each of said actuating rods having its other end rigidly secured to one of said headlight sets for rotational movement therewith about a fixed axis.

References Cited

UNITED STATES PATENTS

| | | | |
|---|---|---|---|
| 2,250,734 | 7/1941 | Thompson et al. | 240—62.3 |
| 3,182,566 | 5/1965 | Berg et al. | 92—24 |
| 3,237,527 | 3/1966 | Martin | 92—143 |

FOREIGN PATENTS

| | | |
|---|---|---|
| 1,079,612 | 5/1954 | France. |

NORTON ANSHER, *Primary Examiner.*

R. M. SHEER, *Assistant Examiner.*